United States Patent [19]

Okada

[11] Patent Number: 4,927,077
[45] Date of Patent: May 22, 1990

[54] HEATER DEVICE FOR MOTOR VEHICLE

[75] Inventor: Masaki Okada, Yokohama, Japan

[73] Assignee: Isuzu Motors Limited, Tokyo, Japan

[21] Appl. No.: 118,947

[22] Filed: Nov. 10, 1987

[30] Foreign Application Priority Data

Nov. 13, 1986 [JP] Japan ................................. 61-270618

[51] Int. Cl.$^5$ ............................................ G05D 23/00
[52] U.S. Cl. .................................... 237/2 A; 431/18; 237/12.3 C
[58] Field of Search ............ 237/2 A, 12.3 C, 12.3 A, 237/12.3 B

[56] References Cited
U.S. PATENT DOCUMENTS

| 2,240,368 | 4/1941 | Le Fevre | 237/12.3 C X |
| 4,411,385 | 10/1983 | Lamkewitz | 237/12.3 C X |
| 4,519,772 | 5/1985 | Mittmann | 237/2 AZ |
| 4,613,072 | 9/1986 | Kikuchi et al. | 237/12.3 C |

Primary Examiner—Henry Bennett
Attorney, Agent, or Firm—Staas & Halsey

[57] ABSTRACT

A heater device for a motor vehicle detects the temperatures of a burner and a heat exchanger when the heater device is shut off. When the detected temperatures reach respective preset values, a combusting blower for supplying combusting air to the burner and a heating blower for supplying heating air to the heat exchanger are actuated to introduce cooling air to the burner and the heat exchanger for thereby preventing the burner and the heat exchanger from being overheated.

7 Claims, 4 Drawing Sheets

HEATER DEVICE FOR MOTOR VEHICLE

BACKGROUND OF THE INVENTION

The present invention relates to a heater apparatus for heating the passenger compartment of a motor vehicle.

The passenger compartment or cabin of a motor vehicle is generally heated by a heat source employing the cooling water of the internal combustion engine on the motor vehicle. However, in cold weather, it takes time to increase the temperature of the cooling water, and hence the compartment cannot be heated quickly.

Japanese Laid-Open Patent Publication No. 61-157422 discloses a proposed vehicle heater device in which fuel is combusted by a burner separate from the internal combustion engine and heat generated by the fuel combustion is recovered by a heat exchanger to supply heating air into the compartment.

In the event that a heating blower is turned off by stopping the operation of the vehicle, turning off a main power supply, or for some other reasons while the heater device is in operation, the fuel combustion in the burner is ceased, but the temperature of the heat exchanger and other components is not quickly lowered because of a heat buildup around the combustion chamber of the burner. The instant the blower is stopped, the temperature may rather be increased into a dangerous range.

SUMMARY OF THE INVENTION

It is an object of the present invention to provide a heater device fo a motor vehicle which prevents a burner thereof from being subjected to an abnormal temperature increase and hence prevents the heater device itself from being brought into a dangerous condition even when the operation of the heater device is abruptly interrupted.

According to the present invention, there is provided a heater device for a motor vehicle comprising a burner for combusting fuel, a heat exchanger for transferring heat between the combustion gas from the burner and heating air to be introduced into the passenger compartment of the motor vehicle, means for detecting when the heater device ceases operation, means for detecting the temperatue of the heater device, and means for actuating a blower to introduce air into the heater device when the temperature detected by the temperature detecting means reaches a prescribed temperature level.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
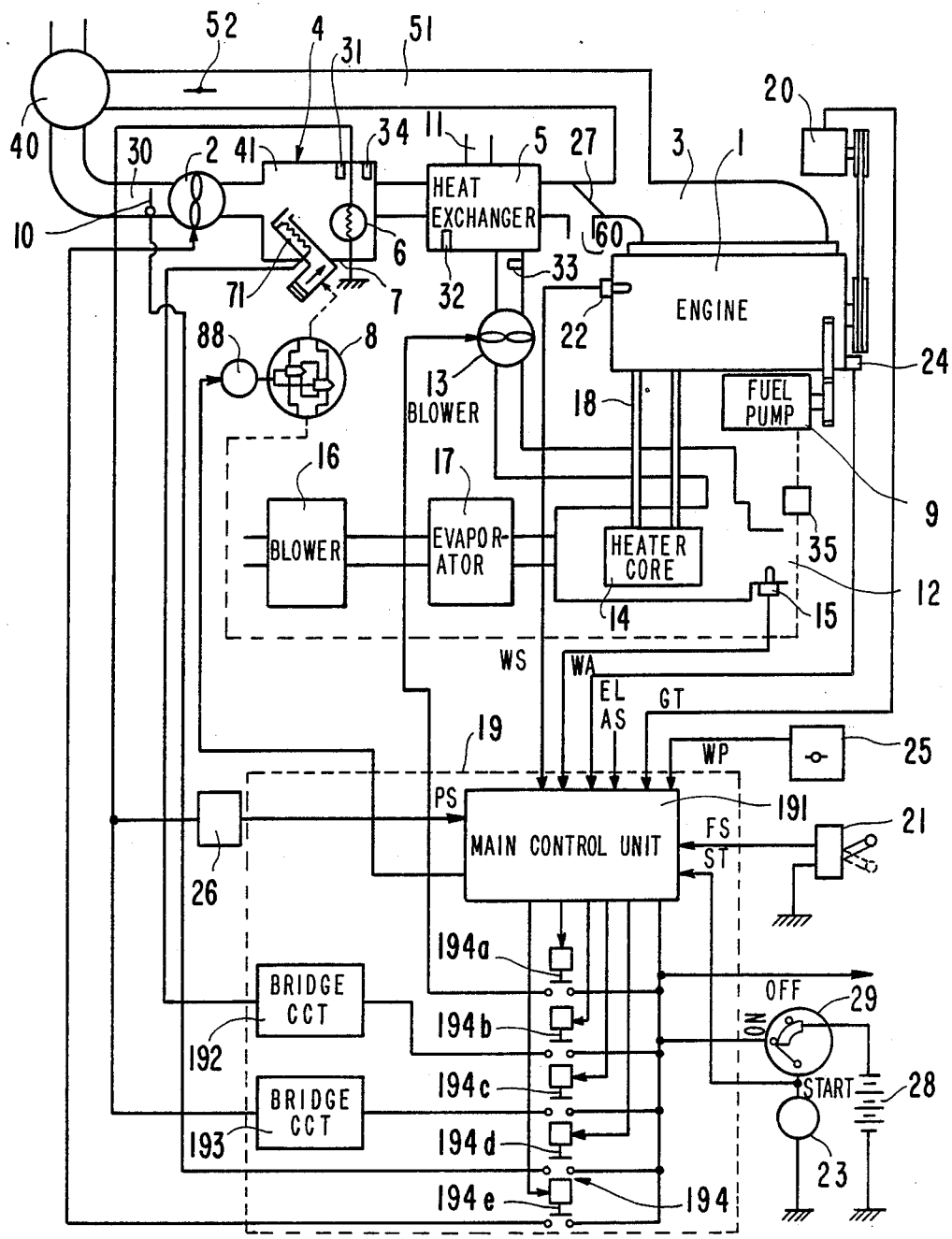
FIG. 1 is a block diagram of a heater device for a motor vehicle according to an embodiment of the present invention.

As shown in FIG. 1, an internal combustion engine 1 such as a diesel engine or a gasoline engine has an intake pipe 3 connected to an air cleaner 40 through an air duct 30. In the air duct 30, there are disposed a combusting blower 2, a burner 4 positioned downstream of the blower 2, and a heat exchanger 5 positioned downstream of the burner 4.

The air duct 30 is bypassed by a bypass pipe 51 which directly introduces air from the air cleaner 2 via the intake pipe 3 to the internal combustion engine 1. The bypass pipe 51 has a control valve 52 controlled by controller 19 (described later).

The burner 4 has a combustion chamber 41, a fuel atomizer 7 inclined such that it extends from the bottom of the combustion chamber 41 near an outlet thereof toward the center of the combustion chamber 41, and an igniting glow plug 6 disposed in the combustion chamber 41 for igniting fuel as atomized by the fuel atomizer 7. The fuel atomizer 7 houses therein an atomizing glow plug 71 in the form of a pipe or a rod made of a ceramic material such as silicon nitride ($Si_2No_4$) for heating and atomizing fuel. The atomizing glow plug 71 has a resistance wire of a positive temperature coefficient which is embedded centrally therein.

The igniting glow plug 6 is in the form of a rod made of a ceramic material such as silicon nitride ($Si_2No_4$) and has a centrally embedded resistance wire. The igniting glow plug 6 can be heated by energizing the resistance wire.

A fuel supply device 8 supplies fuel fed from a fuel pump 9 via a suction valve 35 to the fuel atomizer 7.

The combustible air-fuel mixture in the combustion chamber 41 is ignited by the energized igniting glow plug 6 to produce flames and high-temperature combustion gases which are delivered to the downstream heat exchanger 5.

The combustion gases that have passed through the heat exchanger 5 are then delivered via the intake pipe 3 to the internal combustion engine 1 or via a discharge pipe 60 to an exhaust pipe (not shown) of the internal combustion engine 1, dependent on the position of a directional control valve 27 controlled by the controller 19.

The heat exchange 5 draws fresh air from an air inlet 11 communicating with the passenger compartment to be heated of the motor vehicle and transfers heat from the combustion gases to the fresh air. The hot air heated by the heat exchanger 5 is discharged through an outlet 12 into the passenger compartment by a heating air blower 13.

The outlet 12 is open at the exit of a cooling water heater core 14 which is separately provided for heating the passenger compartment. A hot air temperature sensor 15 is disposed in the exit of the heater core 14 for detecting the temperature of the hot air discharged from the exit. An air blower 16, an air conditioning evaporator 17, and a hot water passage 18 are components of an air conditioning unit which utilizes the engine cooling water. While the heating blower 13 is located downstream of the heat exchanger 5 in the illustrated embodiment, the heating blower 13 may be positioned upstream, i.e., at the air inlet 11.

The controller 19 comprises a main control unit 191 which is supplied with a rotation signal GT from a generator 20 driven by the engine 1, an ON/OFF signal FS from an actuating switch 21, a water temperature signal WS from a water temperature sensor 22 which detects the temperature of the cooling water for the engine 1, a start position signal ST, an accelerator opening signal AS, a load signal EL from an engine load sensor 24 which detects the load condition of the engine 1, a hot air temperature signal WA from the hot air temperature sensor 15 at the outlet 12, a heating signal WP from a heating position switch 25 operated by the driver, and a plug temperature signal PS from an igniting plug sensor 26 which detects the temperature of the igniting glow plug 6. The controller 19 also includes a bridge circuit 192 for controlling the atomising glow plug 71 of the fuel atomizer 7 so that it is heated to the temperature for atomizing the fuel, a bridge circuit 193 for controlling the igniting glow plug 6 so that it is heated to the temperature for igniting the mixture of the atomized fuel and air, and a switch assembly 194.

The main control unit 191 is in the form of a computer having a processor, memories, and an input/output interface.

The bridge circuit 192 comprises a wheatstone bridge having the resistance wire for heating the atomizing glow plug 71 as one branch and three other resistance wires as other branches, a comparator for detecting the balanced condition of the wheatstone bridge, and a relay actuatable by an output from the comparator. The relay turns on and off the resistance wire to heat the atomizing glow plug 71 to the fuel atomizing temperature, e.g., about 500° C. The bridge circuit 193 comprises a wheatstone bridge having the resistance wire for heating the igniting glow plug 6 as one branch and three other resistance wires as other branches, a comparator for detecting the balanced condition of the wheatstone bridge, and a relay actuatable by an output from the comparator. The relay turns on and off the resistance wire to heat the igniting glow plug 6 to the temperature for igniting the mixture of the atomized fuel and air.

The switch assembly 194 has a switch 194a for turning on and off the heating blower 13, a switch 194b for controlling the supply of electric power to the bridge circuit 192, a switch 194c for controlling the supply of electric power to the bridge circuit 193, a switch 194d for controlling a bypass valve 10 in the air duct 30, and a switch 194e for turning on and off the combusting blower 2. A power supply battery 28 and a key switch 29 are used to supply power.

A flame sensor 31 detects the temperature in the combustion chamber 41 of the burner 4 to ascertain whether flames are produced in the combustion chamber 41 or not. An overheat sensor 34 is provided for detecting when the burner 4 is being overheated. Another overheat sensor 32 is provided for detecting when the heat exchanger 5 is being overheated. An overheat sensor 33 serves to detect the temperature of the discharged hot air heated by the heat exchanger 5. Signals fromm these sensors are applied to the main control unit 191 through respective signal lines which are omitted from illustration for the sake of brevity.

Figure 2:
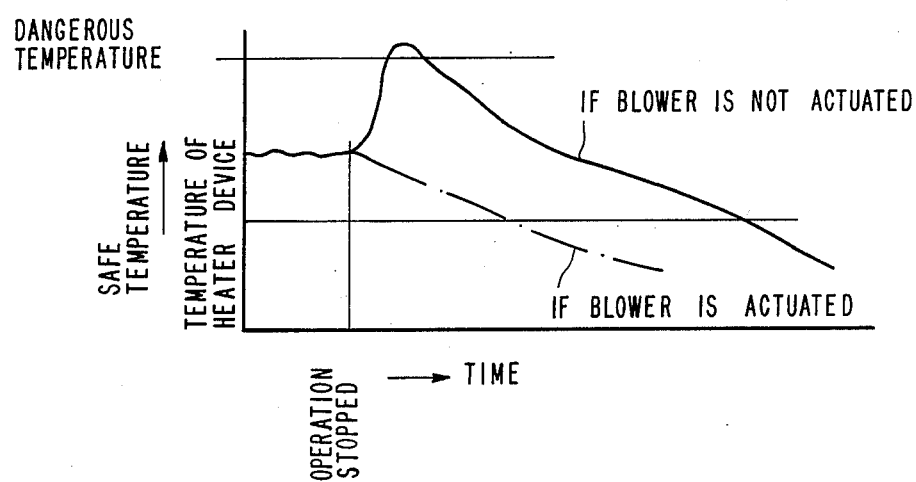
FIG. 2 is a graph showing how the temperature of the heater device varies with time.

FIG. 2 illustrates how the temperature of the burner and the heat exchanger of the heater device varies with time. As shown in FIG. 2, if the heating blower 13 is stopped after the heater device is shut off, the temperature will rise up to a dangerous temperature. However, by continuously operating the heating blower 13 after the heater device is stopped in operation, the heat can be discharged and dangerous conditions can be avoided.

Figure 3:
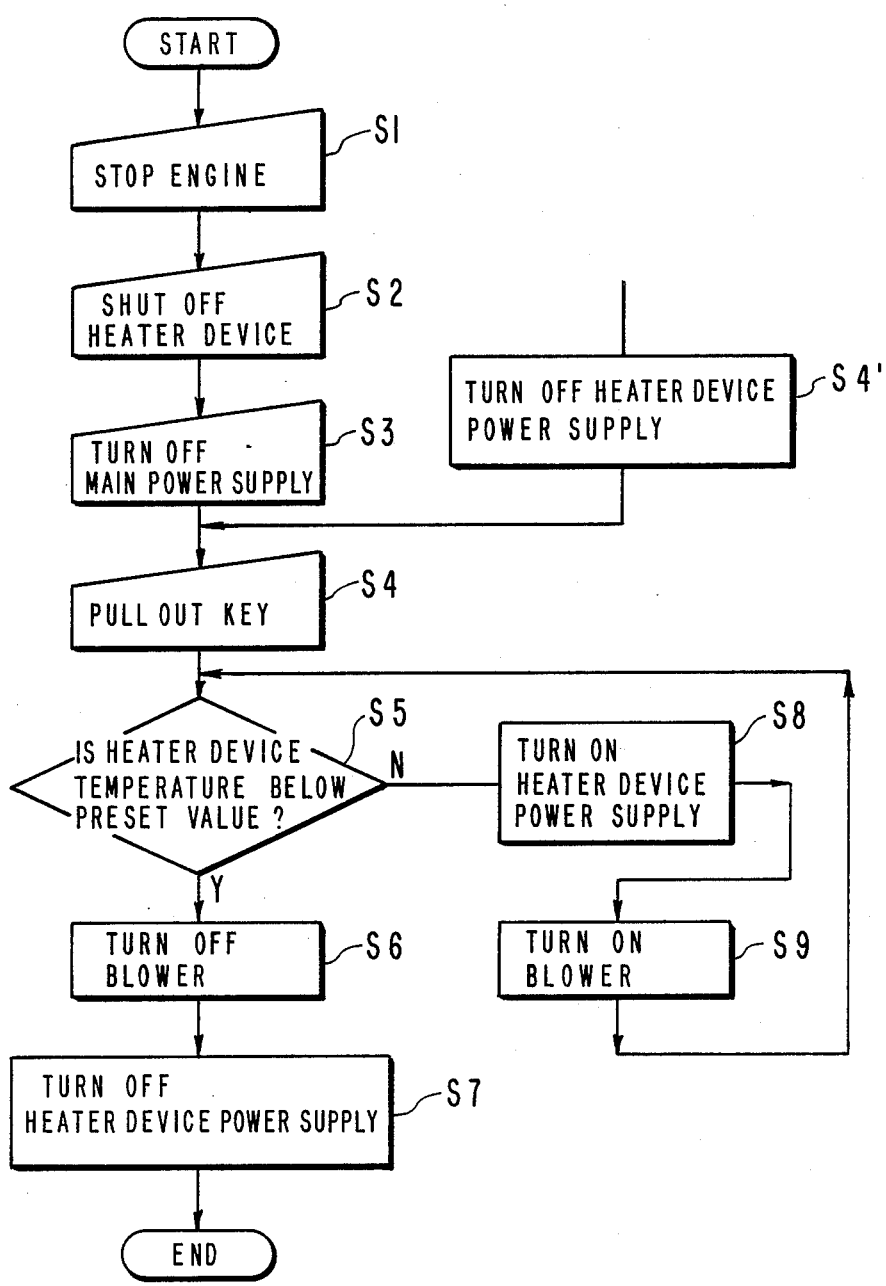
FIG. 3 is a flowchart of a general control seuence of the heater device.

A general control sequence of the heater device of the invention will be described with reference to FIG. 3.

First, the engine is shut off in a step S1, and then the heater device is shut off in a step S2, which is followed by turning off the main power supply in a step S3.

After the heater device power supply is turned off for some reason in a step S4' or the ignition key is pulled out in a step S4, a step S5 ascertains whether or not the temperature of the heater device is equal to or lower than a prescribed temperature level.

If the temperature of the heater device is equal to or lower than the prescribed temperature level, then the heating blower 13 is turned off in a step S6, and the heater device power supply is turned off in a step S7.

If the temperature of the heater device is higher than the prescribed temperature level, then the heater device power supply such as a backup power supply is turned on in a step S8, and the heating blower 13 is turned on in a step S9.

Therefore, the heat of the heater device is discharged, and the heater device temperature does not reach a dangerous temperature.

Figure 4:
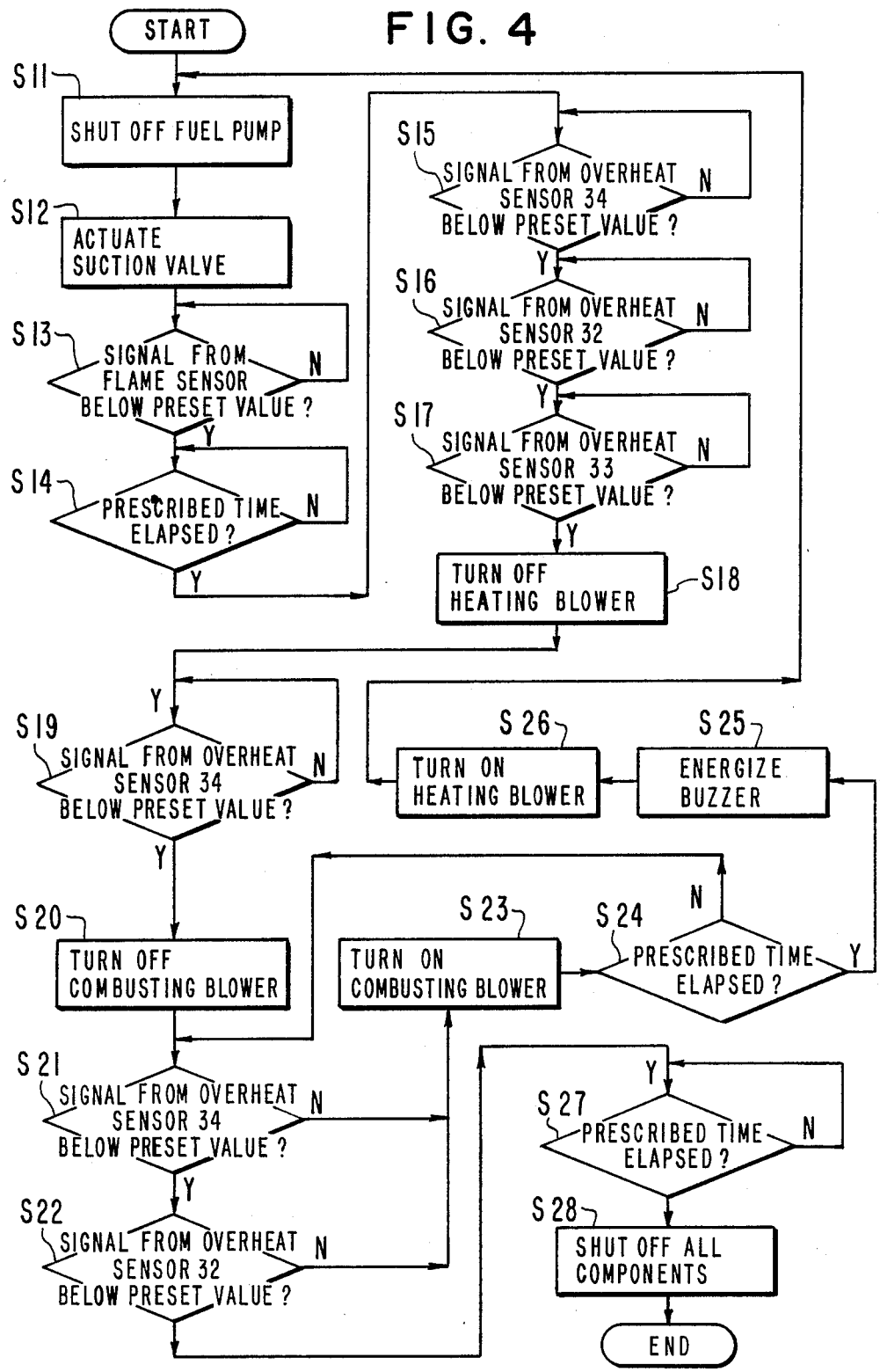
FIG. 4 is a flowchart of a detailed control sequence of the heater device.

A detailed control sequence of the heater device will be described below with reference to FIG. 4.

As described above with reference to FIG. 3, when the key is pulled and a stop command is issued, the fuel pump 99 is stopped in operation in a step S11, and the suction valve 35 is operated in a step S12. The flame sensor 31 ascertains whether flames are generated or not in a step S13. Upon elapse of a present time in a step S14, a step S15 detects whether a signal from the overheat sensor 34 in the burner 4 is below a present value, and then a step S16 detects whether a signal from the overheat sensor 32 in the heat exchanger 5 is below a present value.

Then, a step S17 detects whether a signal from the overheat sensor 33 is below a preset value. If the signals from these sensors are higher than the respective preset values in the steps S15, S16, S17, then it is determined that the heater device is backed up and remained actuated. If the signals from these sensors are below the respective preset values in the steps S15, S16, S17, then the heating blower 13 is shut off in a step S18, and, after the signal from the overheat sensor 34 reaches the preset value in a step S19, the combusting blower 2 is shut off in a step S20.

Then, after the heating blower 13 and the combusting blower 2 are turned off, steps S21, S22 ascertain whether the signals from the overheat sensors 34, 32 are below the respective preset values. If not, i.e., if the temperature in the burner 4 is high and the temperature in the heat exchanger 5 is high, the combusting blower 2 is operated in a step S23. If the signals are still not below the respective preset values upon elapse of a preset time in a step S24, a warning buzzer (not shown) is turned on in a step S25, and the heating blower 13 is actuated in a step S26.

If the signals are below the preset values and a preset interval of time has elapsed in a step S27, all of the device components are shut off in a step S28.

With the present invention, as described above, the temperature sensors are provided in the heater device, and when the temperatures detected by the temperature sensors are higher than respective preset levels at the time the heater device is shut off, the heating blower is actuated to prevent the heater device from being overheated and hence from being brought into dangerous conditions.

Although a certain preferred embodiment has been shown and described, it should be understood that many changes and modifications may be made therein without departing from the scope of the appended claims.

What I claim is:

1. (THREE TIMES AMENDED) A heater apparatus for a motor vehicle, comprising:
   a burner for combusting fuel and producing hot combustion gas;
   a heat exchanger connected to the burner and being operable to transfer heat between the combustion gas from the burner and heating air to be introduced into a passenger compartment of the motor vehicle;
   means for detecting when the burner ceases operation and outputting a signal indicative of a ceased operation condition;
   temperature detecting means connected to the heater apparatus for detecting the temperature of the heater apparatus and outputting a signal indicative of an over heat condition;
   blower means in fluid communication with the heater apparatus; and
   means operable in response to the over heat condition signal and the ceased operation condition signal for actuating the blower means to introduce air into the heater apparatus, thereby lowering the temperature of the heater apparatus.

2. A heater apparatus according to claim 1, wherein said temperature detecting means comprises an overheat sensor connected to the burner for detecting the temperature of said burner.

3. A heater apparatus according to claim 1, wherein said temperature detecting means comprises an overheat sensor connected to the heat exchanger for detecting the temperature of said heat exchanger.

4. A heater apparatus according to claim 1, wherein said blower comprises a combusting air blower for supplying combusting air to said burner.

5. A heater apparatus according to claim 1, wherein said blower comprises a heating air blower for supplying heating air to said heat exchanger.

6. A heater apparatus according to claim 1, wherein the blower means comprises a combusting blower for introducing ambient air into the burner and a heating air blower for circulating heated air from the heat exchanger to the passenger compartment of the motor vehicle, the combusting blower and the heating air blower being individually operable, and means for operating the combusting blower when the temperature detecting means detects an overheat condition.

7. A heater apparatus according to claim 6 further comprising means for operating the heating air blower when the temperature of the heater apparatus does not drop below a predetermined temperature upon a laspe of a predetermined period of time after the combusting blower has been operated.

* * * * *

UNITED STATES PATENT AND TRADEMARK OFFICE
CERTIFICATE OF CORRECTION

PATENT NO. : 4,927,077
DATED : May 22, 1990
INVENTOR(S) : Masaki Okada

It is certified that error appears in the above-identified patent and that said Letters Patent is hereby corrected as shown below:

```
Col. 1, line 35, change "fo" to --for--;
        line 65, change "seunce" to --sequence--.
Col. 2, line 47, change "exchange" to --exchanger--.
Col. 3, line 13, change "atomising" to --atomizing--;
        line 22, change "wheatstone" to --Wheatstone--;
        line 26, change "wheatstone" to --Wheatstone--;
        line 31, change "wheatstone" to --Wheatstone--;
        line 35, change "wheatstone" to --Wheatstone--;
        line 58, change "fromm" to --from--.
Col. 4, line 28, change "99" to --9--;
        line 33, change "present" to --preset--;
        line 36, change "present" to --preset--;
Col. 5, line 10, delete "(THREE TIMES AMENDED)".
Col. 6, line 29, change "laspe" to --lapse--.
```

Signed and Sealed this

Eleventh Day of February, 1992

Attest:

HARRY F. MANBECK, JR.

*Attesting Officer*   *Commissioner of Patents and Trademarks*